April 14, 1925.

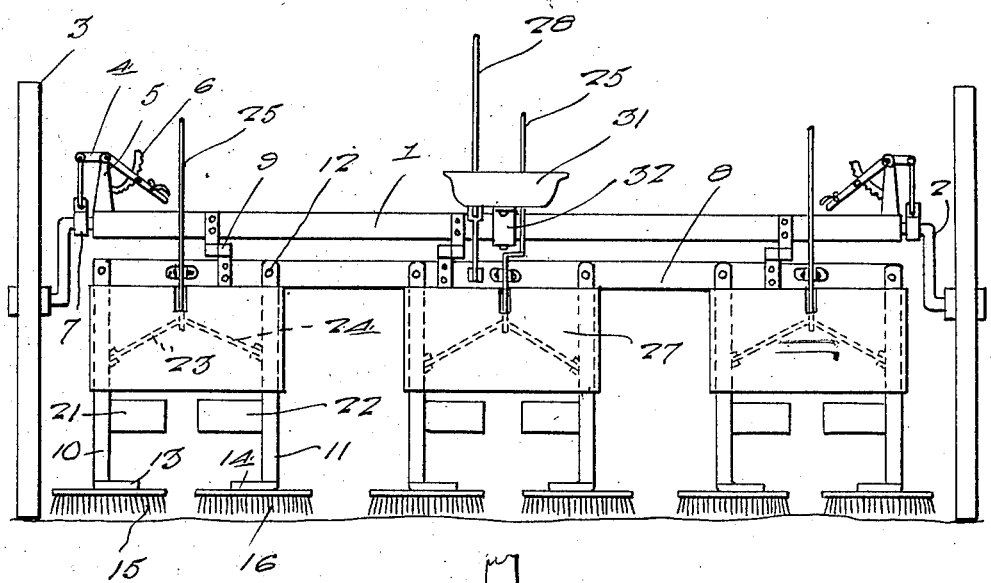
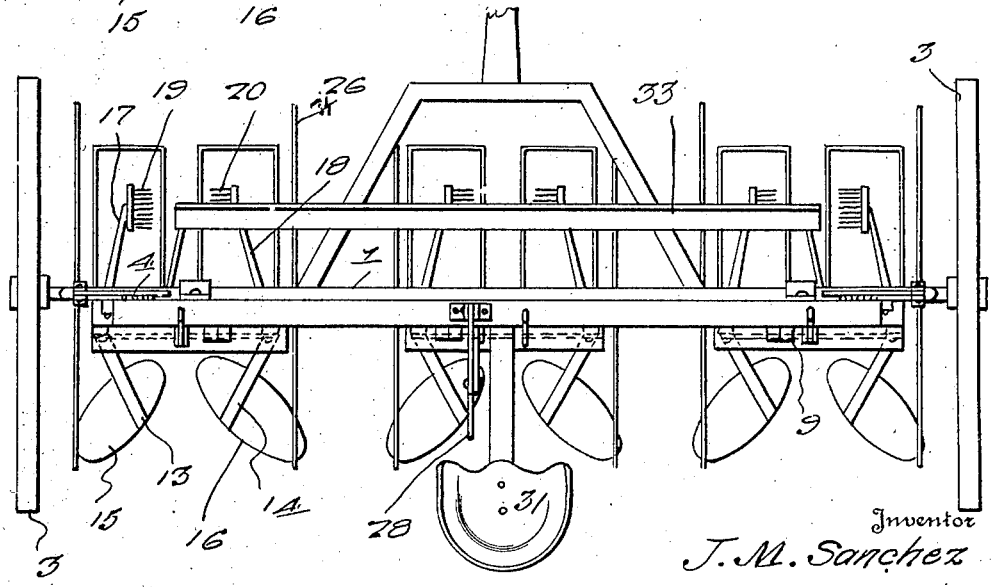

J. M. SANCHEZ

BOLL WEEVIL MACHINE

Filed Aug. 19, 1924

Inventor
J. M. Sanchez

By Clarence A. O'Brien
Attorney

Patented Apr. 14, 1925.

1,533,276

UNITED STATES PATENT OFFICE.

JOSE M. SANCHEZ, OF ZAPATA, TEXAS.

BOLL-WEEVIL MACHINE.

Application filed August 19, 1924. Serial No. 732,956.

*To all whom it may concern:*

Be it known that I, JOSE M. SANCHEZ, a citizen of the United States, residing at Zapata, in the county of Zapata and State of Texas, have invented certain new and useful Improvements in a Boll-Weevil Machine, of which the following is a specification.

This invention relates to improvements in boll weevil machines for exterminating boll weevils and faulty cotton squares from growing plants in a simple and efficient manner.

One of the important objects of the present invention is to provide a boll weevil machine of the above mentioned character, which is adapted to operate over three rows of growing plants, brushes being provided for engaging the plants and knocking the boll weevils and the faulty squares therefrom, receptacles containing an insecticide being disposed below the brushes for receiving the boll weevils and faulty squares removed from the plants completely destroying the same, additional brushes being provided for engagement with the ground whereby the boll weevil and faulty squares which have fallen thereon will also be moved to a position whereby the same will be placed in the sun and consequently exterminated.

A still further object of the invention is to provide a boll weevil machine of the above mentioned character, wherein means is provided for adjusting the several pairs of cooperating brushes with respect to each other, means being further provided for raising or lowering the beam which supports the brush carrying members and the pan.

A further object of the invention is to provide a boll weevil machine of the above mentioned character, which is simple in construction, inexpensive, strong and durable and furthermore adapted for the purposes for which it is designated.

Other objects and advantages of this invention will become apparent during the course of the following description.

In the accompanying drawings forming a part of this specification and in which like numerals designate like parts throughout the same:

Figure 1 is a top plan view of my improved boll weevil machine.

Figure 3 is a rear elevation of the same, and

Figure 2:
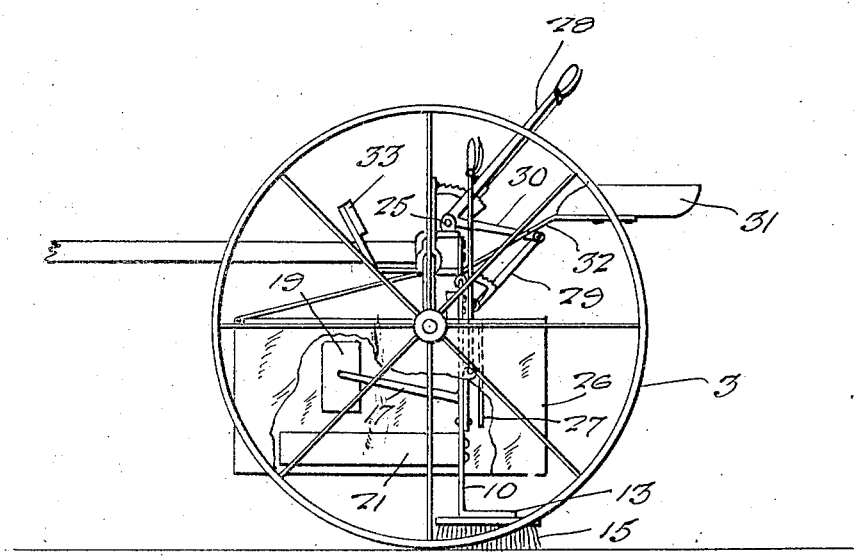
Figure 2 is a side elevation thereof.

In the drawings wherein for the purpose of illustration is shown the preferred embodiment of my invention, the numeral 1 designates the supporting axle, the ends thereof terminating in the crank portions 2 for supporting thereon the traction wheels 3. For the purpose of raising and lowering the traction wheels with respect to the ground, I provide the adjusting levers 4, the same being supported in the brackets 5, the latter further supporting segmental racks 6. It is of course to be understood that each lever 4 is provided with a suitable pawl for cooperation with the respective segmental rack in holding the axle in the various adjusted positions. The outer end of each of the levers 4 is connected to a collar 7 which extends around the axle 1 adjacent the respective end thereof.

Hingedly supported on the axle 1 is the longitudinally extending beam 8. The hinge connections between the axle and the beam is illustrated at 9 in the drawings with reference more particularly to Figures 1 and 3 of the drawings. The longitudinally extending beam provides a means for supporting the plant engaging units and in the present instance three of such units are provided whereby the machine is adapted to move over three rows of growing cotton plants. Each of the units comprises a pair of arms 10 and 11 respectively, the upper ends of which are pivotally supported on the beams 8 as at 12 and the purpose of securing the arms in this manner will hereinafter be more fully described.

Figure 4:
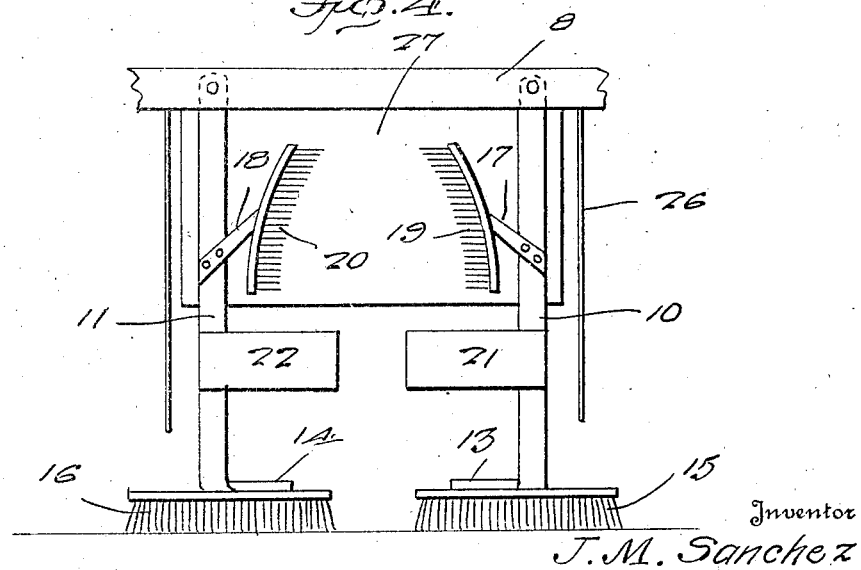
Figure 4 is a front elevation of one of the units.

The lower ends of the arms 10 and 11 of each unit terminate at a point adjacent the ground and are disposed rearwardly in a converging manner as illustrated at 13 and 14 respectively for supporting thereon the angularly disposed ground engaging brushes 15 and 16 respectively. Extending forwardly from the upper portions of the arms 10 and 11 of each unit and converging gradually toward their outer ends are the upper brush supporting members 17 and 18 respectively. The brushes 19 and 20 secured on the outer ends of the converging supporting members 17 and 18 respectively have their bristles facing each other as is clearly illustrated in Figures 1 and 4 of the drawing. The purpose of the provision of the brushes as above described will also hereinafter be more fully described.

Supported on the arms 10 and 11 of each of the units and directly below the upper brushes 19 and 20 are the horizontally extending pans 21 and 22 respectively. The pans are adapted to contain an insecticide for the purpose of exterminating the boll weevils which fall into the pans after the same have been brushed from the plants by the upper brushes 19 and 20.

The adjusting means associated with the arms 10 and 11 of each of the units comprises a pair of links 23 and 24 respectively, the outer ends being secured to the arms 10 and 11 while the inner ends are connected to the lower ends of a suitable operating lever 25, the latter being in turn supported on the longitudinal beam 8 in the manner as clearly illustrated in Figures 2 and 3. By moving the lever 25 in one direction, the arms 10 and 11 and the brushes carried thereby as well as the pans will be brought closer together depending upon the size of the plants over which the boll weevil machine is traveling. By moving the lever 25 of each unit in the other direction, the arms are moved away from each other as is obvious from the construction shown. The pivotal connection 12 at the upper end of each arm with the longitudinal beam allows such adjustment.

Extending horizontally on the opposite sides of each of the arms is the canvas covering 26, any suitable supporting means is provided for holding the canvas coverings in proper position on the respective sides of each of the units and the purpose of the canvas covering is well known in the art, a further detailed description thereof is not thought necessary.

On the back of each of the units is supported a metallic plate 27, the upper edge thereof being loosely connected to the rear face of the longitudinal beam 8 and the plate 27 extends over the upper portion of the arms 10 and 11 directly in the rear of the upper brushes 19 and 20. The purpose of the plate 27 which is associated with each of the units is to cooperate with the upper brushes in shaking the plants after the brushes have passed over the same and it being understood of course that the plates are so arranged as to move over the plants when the machine is traveling over the rows of growing cotton. If desired, face of each plate adjacent the brushes or arms may be covered with sticky insecticide so as to get all of the weevils which may fly and come in contact with the plates. The canvas coverings above described may also be provided on their inner faces with similar adhesive insecticide.

For the purpose of raising and lowering the longitudinal beam 8 so that the arms carried thereby will be moved out of engagement with or in engagement with the ground to provide adjusting levers 28, the same being centrally located on the axle and being connected to the intermediate portion of the longitudinal beam 8 by the link 29. It is also to be understood that the lower portion of the lever 28 terminates in the angularly disposed portion 30 whereby raising and lowering of the longitudinal beam may be easily facilitated.

A seat 31 is supported on the axle by means of the bracket 32 whereby the operator may have ready access to the several levers for operating the same. A foot rest 33 is also associated with the boll weevil machine and any suitable draft appliance may be connected to the machine for conveying the same over the rows of cotton when in operation.

It will thus be seen from the foregoing description, that a boll weevil machine has been provided which will efficiently knock boll weevils and faulty cotton squares from the growing plants by means of the upper brushes and the plates 27, the pans disposed below the upper brushes being adapted to catch the boll weevils and faulty squares knocked from the plants by the brushes and exterminating the same by means of the insecticide contained within the pan. The boll weevils and faulty cotton squares which have fallen on the ground will be engaged by the brushes 15 and 16 and will be brushed in the middle of the space between the rows of growing plants so that the sun will strike the insects and exterminate the same. If desired, a cultivator attachment may be associated with the machine for burying this waste.

While I have shown the preferred embodiment of my invention, it is to be understood that various changes in the size, shape and arrangement of parts may be resorted to without departing from the spirit of the invention and the scope of the appended claims.

Having thus described the invention, what I claim is:—

1. A boll weevil machine comprising an axle, traction wheels on the respective ends thereof, a longitudinal beam hingedly supported on said axle, means for swinging the beam and holding it in adjusted positions, a plant engaging unit including a pair of spaced arms pivotally supported at their upper ends on the longitudinal beam, means for swinging the arm for holding them in adjusted positions in relation to each other, and engaging brushes extending forwardly on the upper portions of the arms of the units, insect receiving pans supported on the arms and disposed below the brushes.

2. In a boll weevil machine, a mobile supporting structure, a beam hingedly supported on said supporting structure, means for swinging the beam and holding it in different adjusted positions, a plant engaging unit including a pair of spaced arms pivotally supported at their upper ends on the beam, means for swinging the arms so that their paths of movement are at right angles to the path of movement of the beam, clamp engaging brushes extending from the arms.

3. In a boll weevil machine, a mobile supporting structure, a beam hingedly mounted thereon, means for swinging the beam and holding it in different adjusted positions, a plant engaging unit including a pair of spaced arms pivotally supported at their upper ends on the beam, plant engaging brushes mounted on the arms, a pair of links one pivotally connected to each arm, and a lever slidably mounted on the beam and engaged with the links, whereby the arms may be swung so as to move the brushes toward or away from each other.

4. In a boll weevil machine, a mobile supporting structure, a beam extending longitudinally of the machine and hinged therebelow, means for swinging the beam and holding it in different adjusted positions, a plant engaging unit including a pair of spaced arms pivotally supported at their upper ends on the beam, means for swinging the arms toward and away from each other and holding them in different adjusted positions, and plant engaging brushes extending from the arms.

In testimony whereof I affix my signature.

J. M. SANCHEZ.